US012673867B2

(12) United States Patent
Mezaki et al.

(10) Patent No.: US 12,673,867 B2
(45) Date of Patent: Jul. 7, 2026

(54) HYDRIDE ION CONDUCTOR

(71) Applicants: AGC Inc., Tokyo (JP); TOKYO INSTITUTE OF TECHNOLOGY, Tokyo (JP)

(72) Inventors: Takeya Mezaki, Tokyo (JP); Yoshitake Toda, Tokyo (JP); Kohta Yamada, Tokyo (JP); Naoki Matsui, Tokyo (JP); Guangzhong Jiang, Tokyo (JP); Ryoji Kanno, Tokyo (JP)

(73) Assignees: AGC INC., Tokyo (JP); Tokyo Institute of Technology, Tokyo (JP)

( * ) Notice: Subject to any disclaimer, the term of this patent is extended or adjusted under 35 U.S.C. 154(b) by 241 days.

(21) Appl. No.: 18/427,393

(22) Filed: Jan. 30, 2024

(65) Prior Publication Data

US 2024/0166513 A1 May 23, 2024

Related U.S. Application Data

(63) Continuation of application No. PCT/JP2022/028955, filed on Jul. 27, 2022.

(30) Foreign Application Priority Data

Aug. 6, 2021 (JP) ................................. 2021-130271

(51) Int. Cl.
*C01B 6/24* (2006.01)
*C01F 11/22* (2006.01)
(Continued)

(52) U.S. Cl.
CPC ............... *C01B 6/246* (2013.01); *C01B 6/24* (2013.01); *C01F 11/22* (2013.01);
(Continued)

(58) Field of Classification Search
CPC ... C01B 6/246; C01B 6/24; C01B 6/04; C01F 11/22; C01F 11/00; C01P 2002/50;
(Continued)

(56) References Cited

U.S. PATENT DOCUMENTS

| | | | | |
|---|---|---|---|---|
| 2011/0220839 A1* | 9/2011 | Wong | ................... | C09K 23/017 |
| | | | | 977/773 |
| 2014/0050653 A1* | 2/2014 | Tamura | ..................... | C01B 9/08 |
| | | | | 423/464 |
| 2016/0149137 A1* | 5/2016 | Son | ...................... | H10K 85/113 |
| | | | | 526/240 |

FOREIGN PATENT DOCUMENTS

| | | |
|---|---|---|
| CN | 102530872 A | 7/2012 |
| JP | 2011-204632 A | 10/2011 |
| JP | 5540179 B2 | 7/2014 |
| JP | 2017-098067 A | 6/2017 |

OTHER PUBLICATIONS

Fukui et al., "Characteristic fast H-ion conduction in oxygen-substituted lanthanum hydride," Nature Communications, vol. 10, Article No. 2578, 2019, pp. 1-8.

(Continued)

*Primary Examiner* — Christian Roldan
(74) *Attorney, Agent, or Firm* — Foley & Lardner LLP

(57) ABSTRACT

A hydride ion conductor is represented by:

$MAMBH_{4-x}F_x$      Formula (1), where

MA is selected from the group consisting of Ca, Sr, and Ba, MB is selected from the group consisting of Mg and Ca, and is different from MA, and x is $0<x<4$.

4 Claims, 7 Drawing Sheets

(51) Int. Cl.
　　　*H01M 8/1016*　　　(2016.01)
　　　*H01M 10/0562*　　　(2010.01)

(52) U.S. Cl.
　　　CPC ....... *H01M 8/1016* (2013.01); *C01P 2002/50*
　　　　　(2013.01); *C01P 2002/72* (2013.01); *C01P*
　　　　　*2002/77* (2013.01); *C01P 2002/88* (2013.01);
　　　　　*C01P 2006/40* (2013.01); *H01M 10/0562*
　　　　　(2013.01); *H01M 2300/0068* (2013.01); *H01M*
　　　　　　　　　　　　　　*2300/008* (2013.01)

(58) Field of Classification Search
　　　CPC .............. C01P 2002/72; C01P 2002/77; C01P
　　　　　　　　2002/88; C01P 2006/40; H01M 8/1016;
　　　　　　　　H01M 10/0562; H01M 2300/0068; H01M
　　　　　　　　　　　2300/008; H01B 1/06; Y02E 60/50
　　　See application file for complete search history.

(56)　　　　　　　　References Cited

OTHER PUBLICATIONS

Verbraeken et al., "High H-ionic conductivity in barium hydride", Nature Materials, vol. 14, 2015, pp. 95-100.
International Searching Authority, "International Search Report," issued in connection with International Patent Application No. PCT/JP2022/028955, dated Sep. 27, 2022.
International Searching Authority, "Written Opinion," issued in connection with International Patent Application No. PCT/JP2022/028955, dated Sep. 27, 2022.
European Extended Search Report issued in corresponding European Patent Application No. 22852920.2 dated Jun. 24, 2025.

* cited by examiner

START

MIX PREDETERMINED RAW MATERIAL POWDER AND PREPARE MIXED POWDER ~S110

THERMALLY TREAT MIXED POWDER ~S120

END

Intensity (arb.u.)

$2\theta/°$ (CuK$\alpha$)

HYDRIDE ION CONDUCTOR

CROSS-REFERENCE TO RELATED APPLICATIONS

This application is a continuation application of International Application No. PCT/JP2022/028955 filed on Jul. 27, 2022, and designated the U.S., which is based upon and claims priority to Japanese Patent Application No. 2021-130271, filed on Aug. 6, 2021, the entire contents of which are incorporated herein by reference.

BACKGROUND

1. Field of the Invention

The present disclosure relates to hydride ion conductors.

2. Description of the Related Art

Hydride ions (H⁻) formed of a hydrogen atom and two electrons are lighter than lithium ions and have many features, e.g., the ionic radius of the hydride ion is approximately equal to that of a fluoride ion (F⁻). Such hydride ions are charge carriers that are attractive from the viewpoint of electrochemistry.

For example, when hydride ion conductors are used as ion conductors instead of existing protons (H⁺) and lithium ions (Li⁺) in electrochemical devices such as fuel cells, secondary cells, and the like, new energy devices may be feasible.

There have been reports on some hydride ion conductors that exhibit high ion conductivity (e.g., Keiga Fukui, et al., "Characteristic fast H– ion conduction in oxygen-substituted lanthanum hydride", nature communications, (2019) 10:2578; and Maarten C. Verbraeken, et al., "High H⁻ ionic conductivity in barium hydride", nature materials, vol. 14, p. 95-p. 100, January, 2015).

SUMMARY

In the present disclosure,
provided is a hydride ion conductor, in which the hydride ion conductor is represented by:

$$MAMBH_{4-x}F_x \qquad \text{Formula (1), where}$$

MA is selected from the group consisting of Ca, Sr, and Ba,
MB is selected from the group consisting of Mg and Ca, and is different from MA, and
x is 0<x<4.
Also, in the present disclosure,
provided is a hydride ion conductor, in which the hydride ion conductor has a $BaZnF_4$-type structure, and
conductivity at 300° C. of the hydride ion conductor is $10^{-5}$ S/cm or higher.

DESCRIPTION OF THE EMBODIMENTS

There is an issue about the stability of the existing hydride ion conductor. That is, the existing hydride ion conductor is rapidly decomposed upon exposure to the atmospheric environment, which is disadvantageous.

For this reason, in order to apply such a hydride ion conductor to electrochemical devices in practice, there is an expected need for a hydride ion conductor that is stable in the atmospheric environment.

The present disclosure has been made in view of such a background, and it is an objective of the present disclosure to provide a hydride ion conductor that is more stable in the atmospheric environment.

Hereinafter, one embodiment of the present disclosure will be described with reference to the drawings.
(Hydride Ion Conductor According to One Embodiment of the Present Disclosure)
In one embodiment of the present disclosure,
provided is a hydride ion conductor, in which the hydride ion conductor is represented by:

$$MAMBH_{4-x}F_x \qquad \text{Formula (1), where}$$

Figure 1:
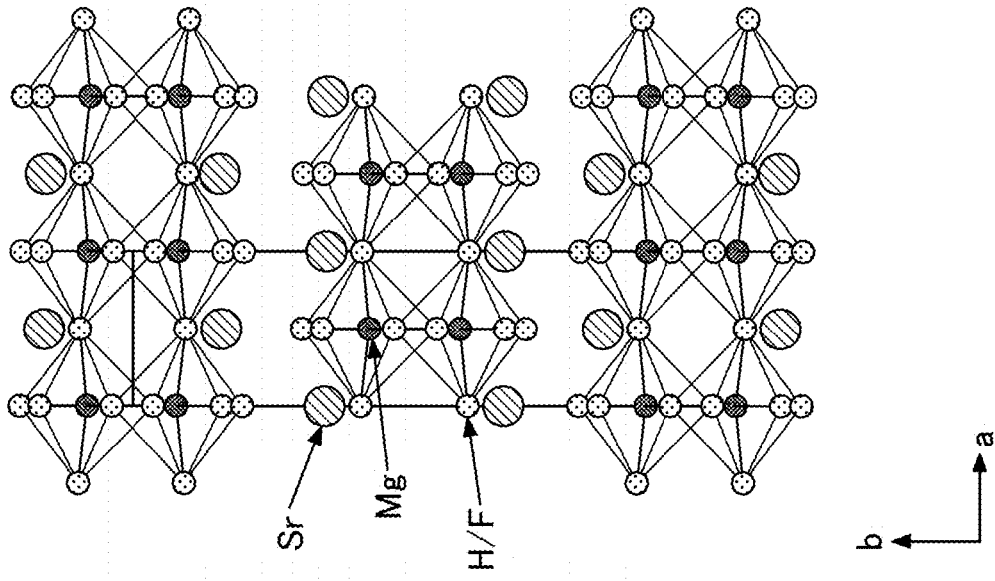
FIG. 1 is a view schematically illustrating a crystal structure of a hydride ion conductor according to one embodiment of the present disclosure.
Figure 1:
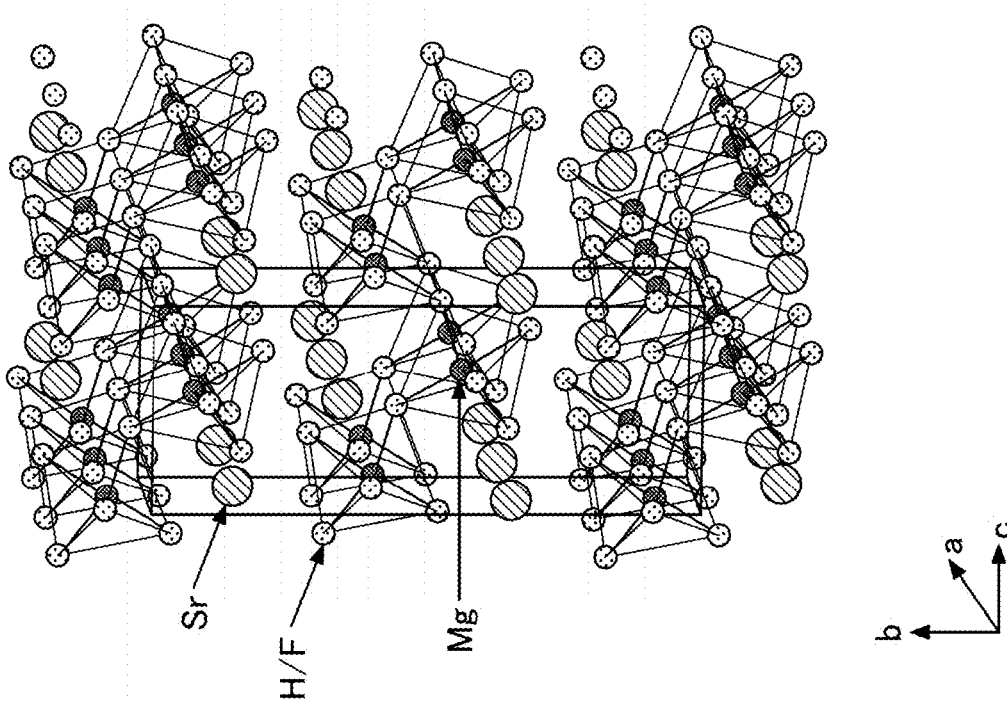

MA is selected from the group consisting of Ca, Sr, and Ba,
MB is selected from the group consisting of Mg and Ca, and is different from MA, and
x is 0<x<4.
Also, in one embodiment of the present disclosure,
provided is a hydride ion conductor, in which the hydride ion conductor has a $BaZnF_4$-type structure, and
conductivity at 300° C. of the hydride ion conductor is $10^{-5}$ S/cm or higher.
The hydride ion conductor according to one embodiment of the present disclosure has a $BaZnF_4$-type structure.
FIG. 1 schematically illustrates the crystal structure of $BaZnF_4$, which is the structure of the hydride ion conductor according to one embodiment of the present disclosure.
The hydride ion conductor according to one embodiment of the present disclosure has stability in the atmospheric environment significantly higher than the stability of the existing hydride ion conductor.
For example, the conductivity at 300° C. of the hydride ion conductor according to one embodiment of the present disclosure does not decrease even if the hydride ion conductor is left to stand for one week in the atmosphere.

Note that, at present, why the hydride ion conductor according to one embodiment of the present disclosure is stable in the atmosphere is not sufficiently understood.

In general, however, a F atom is bonded to a cation with a high bonding force. Therefore, in the hydride ion conductor according to one embodiment of the present disclosure having the structure in which some hydrogen (H) atoms are substituted with fluorine (F) atoms, such an increase in the bonding force between cations and anions is considered to contribute to the stability.

In this way, in one embodiment of the present disclosure, it is possible to provide a hydride ion conductor that is readily handled in the atmosphere, and such a hydride ion conductor is more readily applied to electrochemical devices than before.

(Specific Examples of the Hydride Ion Conductor According to One Embodiment of the Present Disclosure)

Next, specific examples of the hydride ion conductor according to one embodiment of the present disclosure having the above-described features will be described.

($SrMgH_{4-x}F_x$-Based Materials)

In $SrMgH_4$ that is a material having a $BaZnF_4$-type structure, by substituting some hydrogen atoms (H) of $SrMgH_4$ with fluorine atoms (F), $SrMgH_{4-x}F_x$-based materials are obtained. The $SrMgH_{4-x}F_x$-based materials correspond to the above formula (1) where MA=Sr and MB=Mg.

Here, as described above, x is $0<x<4$. As the value of x increases, the atmospheric stability of the material increases. Therefore, x is preferably one or more. Also, when the value of x is 3 or less, favorable conductivity of the $SrMgH_{4-x}F_x$-based materials is obtained.

Figure 2:
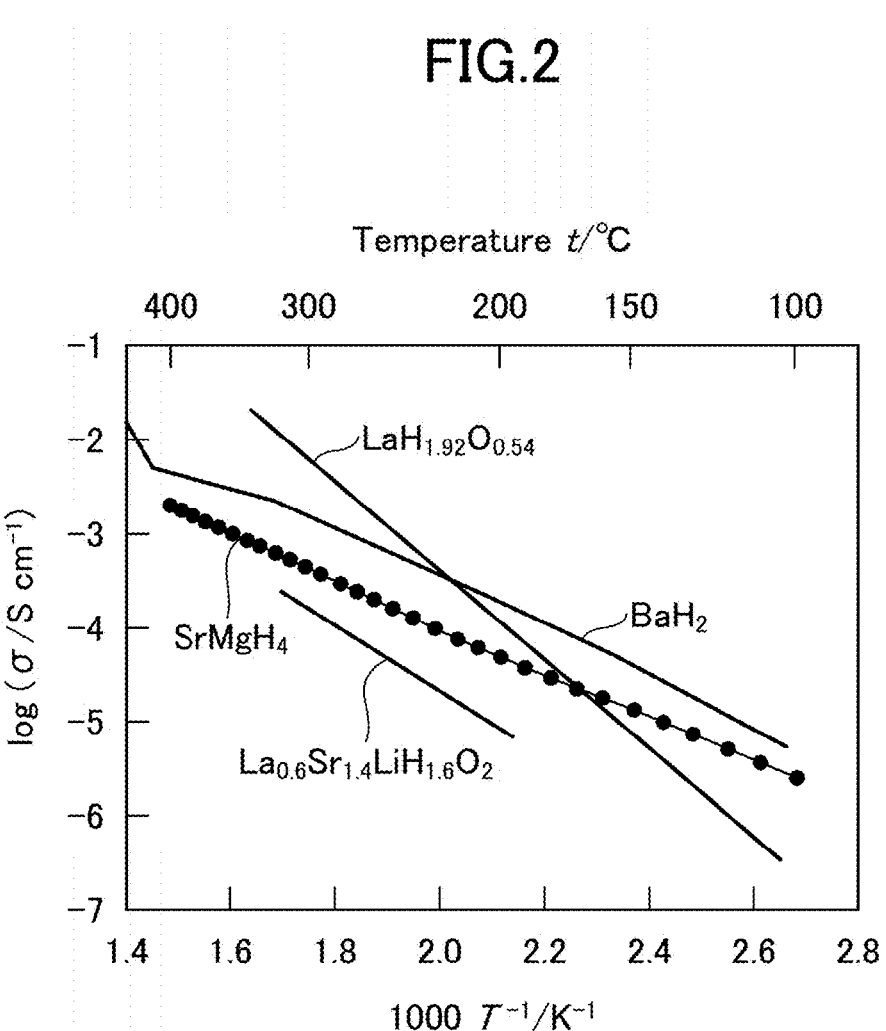
FIG. 2 is a reference graph collectively indicating temperature dependencies of conductivity of $BaH_2$, $LaH_{1.92}O_{0.54}$, $La_{0.6}Sr_{1.4}LiH_{1.6}O_2$, and $SrMgH_4$.

For reference, FIG. 2 collectively indicates temperature dependencies of conductivity of various hydride ion conductors.

In FIG. 2, the temperature dependencies of $BaH_2$, $LaH_{1.92}O_{0.54}$, $La_{0.6}Sr_{1.4}LiH_{1.6}O_2$, and $SrMgH_4$ are indicated.

Figure 3:
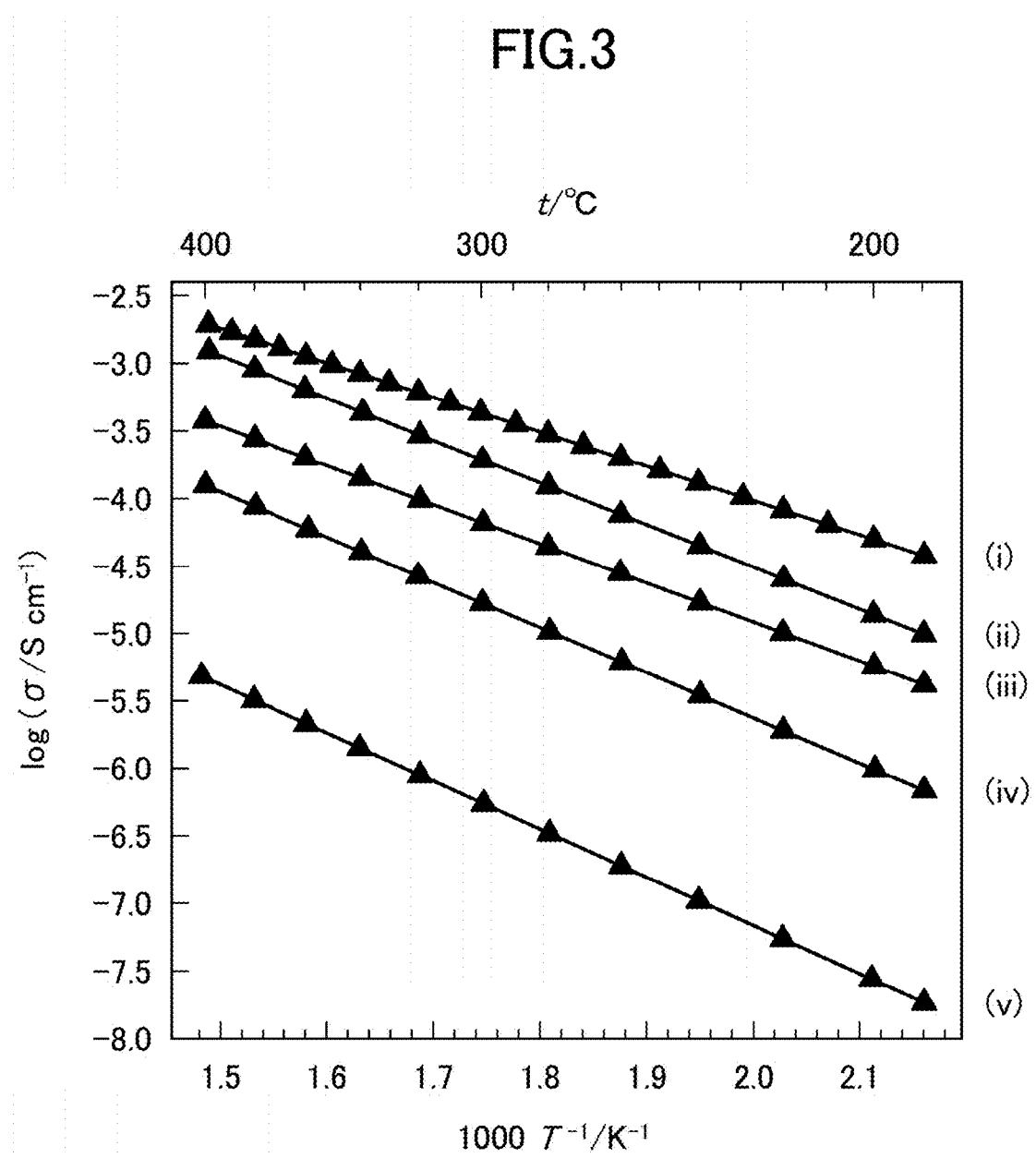
FIG. 3 is a graph collectively indicating temperature dependencies of conductivity of $SrMgH_{4-x}F_x$-based materials that are one type of the hydride ion conductor according to one embodiment of the present disclosure.

Also, FIG. 3 collectively indicates temperature dependencies of conductivity of the $SrMgH_{4-x}F_x$-based materials. In FIG. 3, (i) indicates behaviors of a $SrMgH_4$ material, (ii) indicates behaviors of a $SrMgH_3F_1$ material, (iii) indicates behaviors of a $SrMgH_2F_2$ material, (iv) indicates behaviors of a $SrMgH_1F_3$ material, and (v) indicates behaviors of a $SrMgF_4$ material.

FIG. 3 indicates that as the value of x is smaller in the $SrMgH_{4-x}F_x$-based materials, the conductivity of the $SrMgH_{4-x}F_x$-based materials tends to increase.

In one embodiment of the present disclosure, the conductivity at 300° C. of the $SrMgH_{4-x}F_x$-based materials is preferably $10^{-5}$ S/cm or higher.

($BaMgH_{4-x}F_x$-Based Materials)

In $BaMgH_4$ that is a material having a $BaZnF_4$-type structure, by substituting some hydrogen atoms (H) of $BaMgH_4$ with fluorine atoms (F), $BaMgH_{4-x}F_x$-based materials are obtained. The $BaMgH_{4-x}F_x$-based materials correspond to the above formula (1) where MA=Ba and MB=Mg.

As described above, x is $0<x<4$. When the value of x is 3 or less, favorable conductivity of the $BaMgH_{4-x}F_x$-based materials is obtained. Also, as the value of x increases, the atmospheric stability of the material increases. X is preferably in a range of from 1 through 3.

(Production Method for the Hydride Ion Conductor According to One Embodiment of the Present Disclosure)

Hereinafter, a production method for the hydride ion conductor according to one embodiment of the present disclosure will be briefly described with reference to FIG. 4.

Figures 4, 5:
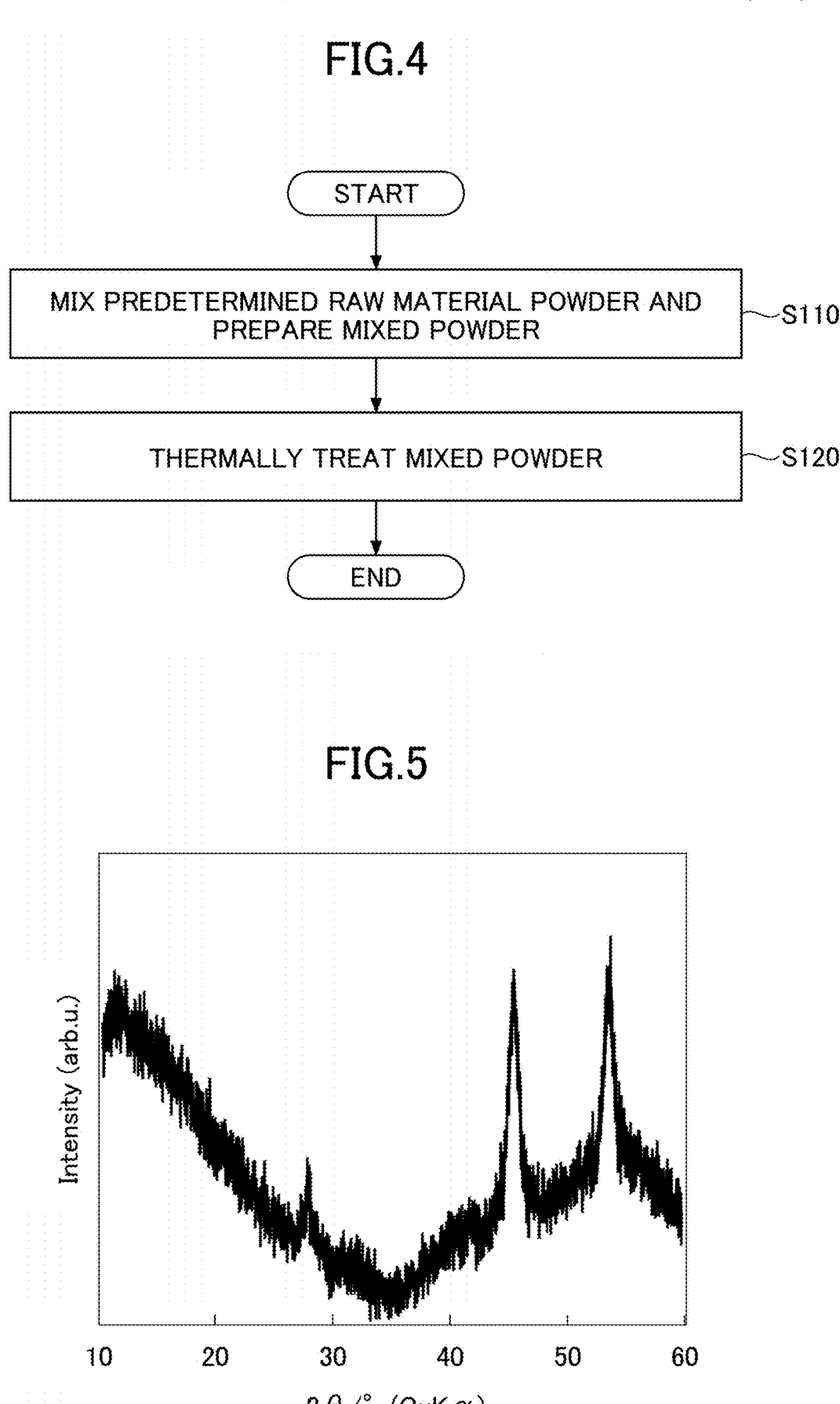
FIG. 4 is a view schematically illustrating a flow of a production method for the hydride ion conductor according to one embodiment of the present disclosure.
FIG. 5 is a chart indicating X-ray diffraction results after atmospheric exposure of the hydride ion conductor according to one embodiment of the present disclosure (Sample 1).

FIG. 4 is a view schematically illustrating a flow of the production method for the hydride ion conductor according to one embodiment of the present disclosure.

As illustrated in FIG. 4, the production method for the hydride ion conductor according to one embodiment of the present disclosure includes (i) a step of mixing predetermined raw materials and preparing mixed powder (step S110), and (ii) a step of thermally treating the mixed powder (step S120).

Note that, the steps in the production method for the hydride ion conductor according to one embodiment of the present disclosure are performed in, for example, an inert gas atmosphere or a hydrogen atmosphere, which is not an open-air atmosphere.

In the following, each of the steps will be described.

(Step S110)

First, raw materials are provided.

As the raw materials, for example, hydrides of metal MA and metal MB, and fluorides of metal MA and metal MB are used.

For example, when producing $SrMgH_{4-x}F_x$-based hydride ion conductors, $SrH_2$ powder, $MgH_2$ powder, $SrF_2$ powder, $MgF_2$ powder, and the like may be used. Alternatively, when producing $BaMgH_{4-x}F_x$-based hydride ion conductors, $BaH_2$ powder, $MgH_2$ powder, $BaF_2$ powder, $MgF_2$ powder, and the like may be used.

The raw materials may be sufficiently mixed using a ball mill or the like.

The obtained mixed powder may be molded. In this case, the hydride ion conductor can be provided as a molded body.

(Step S120)

Next, the obtained mixed powder is thermally treated at a high temperature, thereby producing the hydride ion conductor.

For this treatment, a cubic-anvil high-pressure apparatus may be used. In use of this apparatus, a cubic called a pyrophyllite cell is used, and the mixed powder is charged into this cell. Subsequently, the cubic-anvil high-pressure apparatus is caused to generate a hydrostatic pressure of an ultrahigh pressure, and can isotropically pressurize six faces of the pyrophyllite cell disposed in an interior thereof.

The pressure applied to the pyrophyllite cell is, for example, in a range of from 1 GPa through 6 GPa.

The treatment temperature is, for example, from 500° C. through 1,000° C.

Through the above steps, the hydride ion conductor according to one embodiment of the present disclosure can be produced.

Note that, in the above production method, step S120 is not necessarily performed. That is, the hydride ion conductor according to one embodiment of the present disclosure may be provided in the form of the mixed powder.

Also, the above production method is merely one example, and the hydride ion conductor according to one embodiment of the present disclosure may be produced by a different production method.

EXAMPLES

By the following method, samples of the hydride ion conductor were prepared. Also, the prepared samples were evaluated for characteristics. Note in the following that, Example 1 to Example 3 are Working Examples, and Example 11 and Example 12 are Comparative Examples.

Example 1

By the following method, samples for evaluation were prepared.
(Production of $SrMgH_{4-x}F_x$-Based Samples)

In an Ar atmosphere, 1.338 g of $SrH_2$ powder (obtained from Mitsuwa Chemicals), 0.197 g of $MgH_2$ powder (obtained from Wako Pure Chemical Corporation), and 0.465 g of $MgF_2$ powder (obtained from Mitsuwa Chemicals) were weighed and mixed, thereby preparing mixed powder.

The particle diameter of the $SrH_2$ powder is from 0.1 through 200 μm, the particle diameter of the $MgH_2$ powder is from 0.1 through 200 μm, and the particle diameter of the $MgF_2$ powder is from 0.1 through 200 μm.

In the mixed powder, the ratio of H:F was set to 3:1 (by mol).

The obtained mixed powder was charged into a planetary ball mill (containing zirconia balls), followed by milling and mixing at room temperature. The number of rotations was set to 600 rpm and the treatment time was set to 48 hours.

Thereby, a hydride ion conductor (hereinafter referred to as "Sample 1") was produced.

Example 2

By a similar method to the method in Example 1, a hydride ion conductor was produced. In Example 2, however, the ratio of H:F in the mixed powder was set to 2:2 (by mol). The other conditions were the same as in Example 1.

Thereby, the hydride ion conductor (hereinafter referred to as "Sample 2") was produced.

Example 3

By a similar method to the method in Example 1, a hydride ion conductor was produced. In Example 3, however, the ratio of H:F in the mixed powder was set to 1:3 (by mol). The other conditions were the same as in Example 1.

Thereby, the hydride ion conductor (hereinafter referred to as "Sample 3") was produced.

Example 11

By a similar method to the method in Example 1, a hydride ion conductor was produced. In Example 11, however, the mixed powder was prepared without addition of the $MgF_2$ powder. The composition of the mixed powder is $SrMgH_4$ as a stoichiometric ratio. The other conditions were the same as in Example 1.

Thereby, the hydride ion conductor (hereinafter referred to as "Sample 11") was produced.

Example 12

By a similar method to the method in Example 1, a sample was produced. In Example 12, however, in an Ar atmosphere, 1.337 g of $SrF_2$ powder and 0.663 g of $MgF_2$ powder were weighed and mixed, thereby preparing mixed powder. No hydride was added to the raw materials. The composition of the mixed powder is $SrMgF_4$ as a stoichiometric ratio. The other conditions were the same as in Example 1.

Thereby, a sample (hereinafter referred to as "Sample 12") was produced.
(Evaluations)
(Atmospheric Exposure Test)

The produced samples were exposed to the atmospheric environment having a relative humidity of from 50 through 60%, and the states of the samples were observed.

Also, the following evaluations were performed using the samples before the atmospheric exposure and after the atmospheric exposure.
(X-Ray Diffraction Analysis)

Using a benchtop X-ray diffraction analyzer (Mini-Flex600; obtained from RIGAKU), X-ray diffraction analysis of each sample was performed. Note that, the measurement before the atmospheric exposure was performed in an argon atmosphere, and the measurement after the atmospheric exposure was performed in an open-air atmosphere.
(Alternating Current Impedance Measurement)

Each sample was molded to produce a molded body having a diameter of about 6 mmφ and a thickness of about 2 mm. Gold electrodes were contacted with both of the bottom surfaces of this molded body, and the alternating current impedance measurement was performed using an atmosphere-controllable measurement cell.

As a measurement device, VSP-300 (obtained from Bio-Logic) was used. A measurement frequency was set to be from 1 Hz through 7 MHz, and an applied alternating voltage was set to be from 50 through 500 mV. The measurement was performed in a hydrogen atmosphere. The conductivity was calculated from the measurement results (cole-cole-plot).
(Results)

Table 1 below collectively shows the evaluation results obtained in the samples.

TABLE 1

Figure 6:
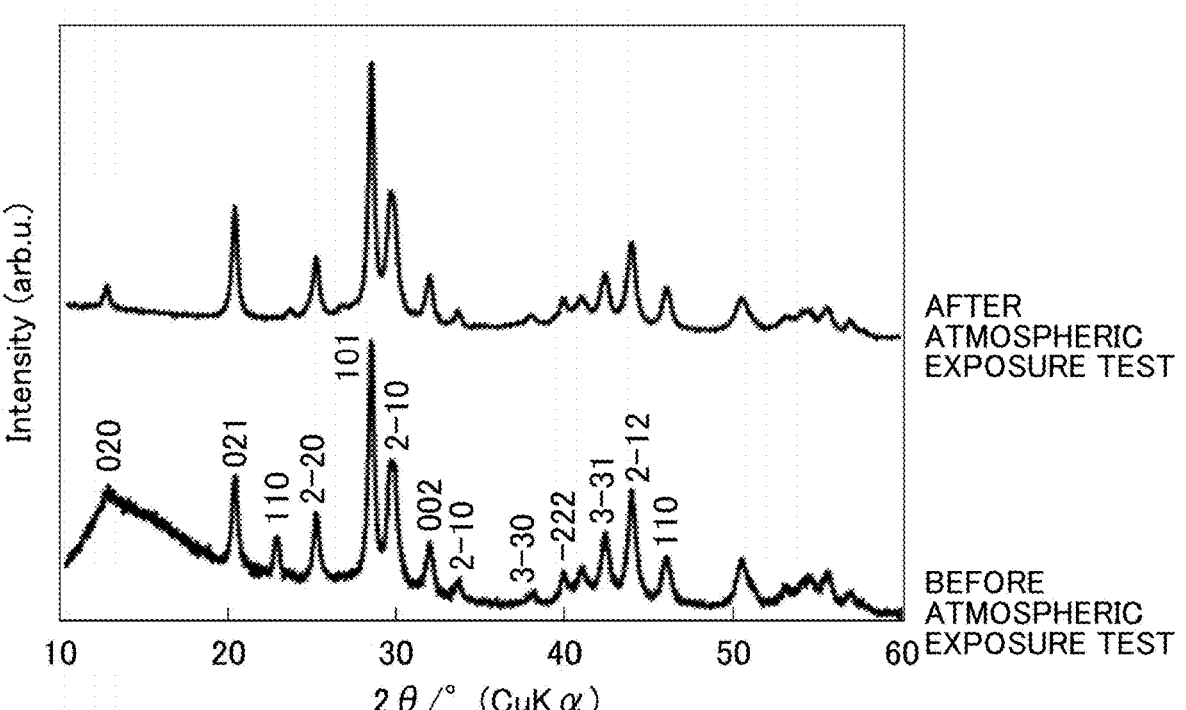
FIG. 6 is a chart indicating X-ray diffraction results before and after atmospheric exposure of the hydride ion conductor according to one embodiment of the present disclosure (Sample 2).
Figure 7:
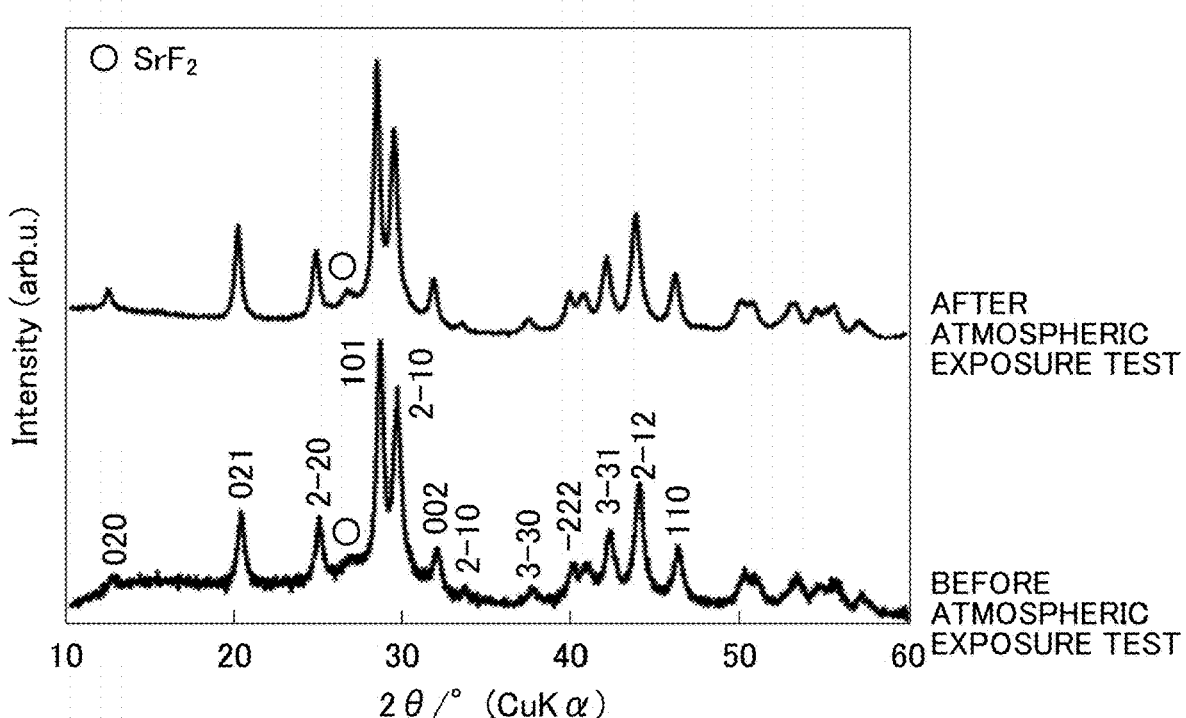
FIG. 7 is a chart indicating X-ray diffraction results before and after atmospheric exposure of the hydride ion conductor according to one embodiment of the present disclosure (Sample 3).
Figure 8:
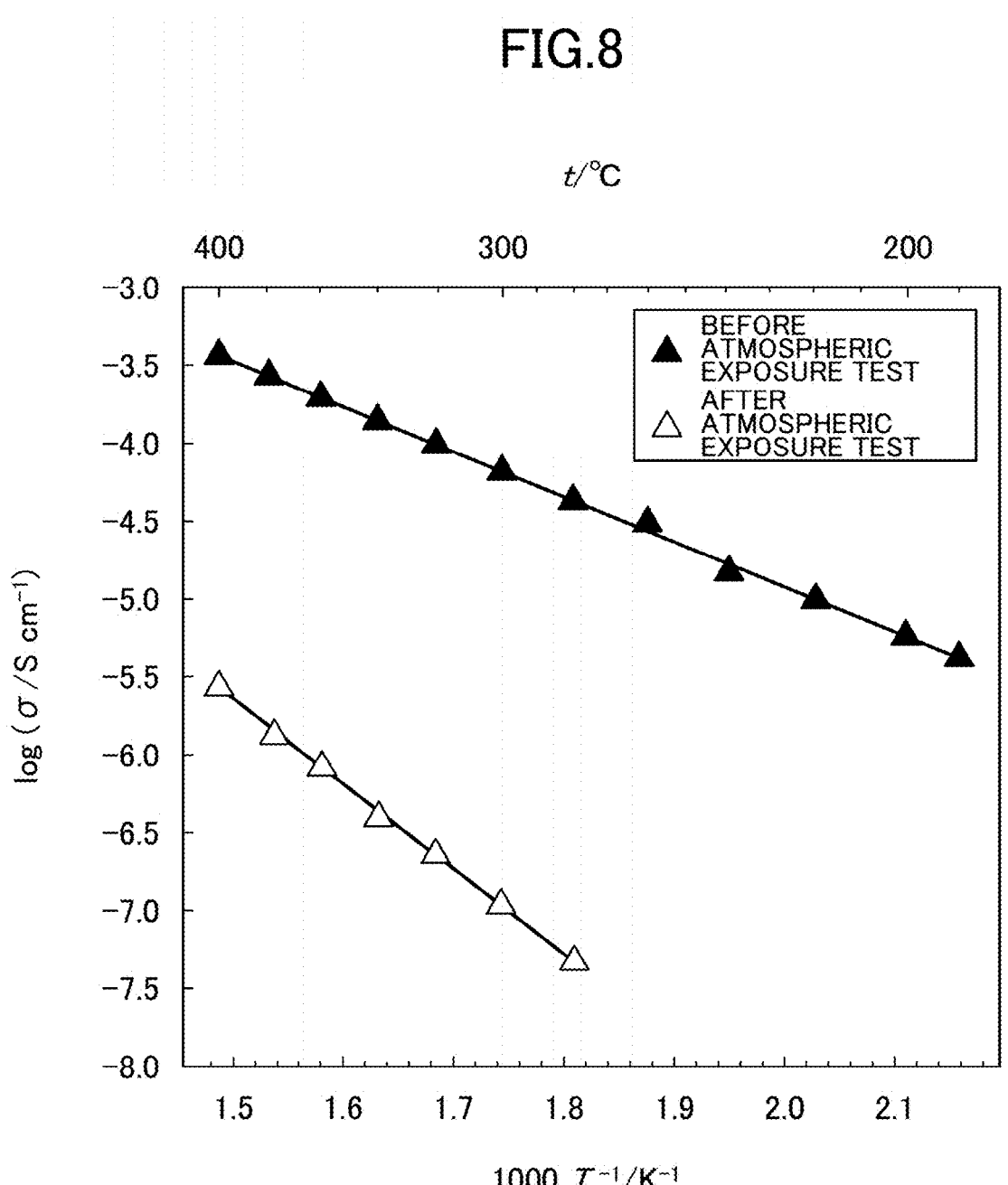
FIG. 8 is a graph indicating temperature dependencies of conductivity of the hydride ion conductor according to one embodiment of the present disclosure (Sample 2).
Figure 9:
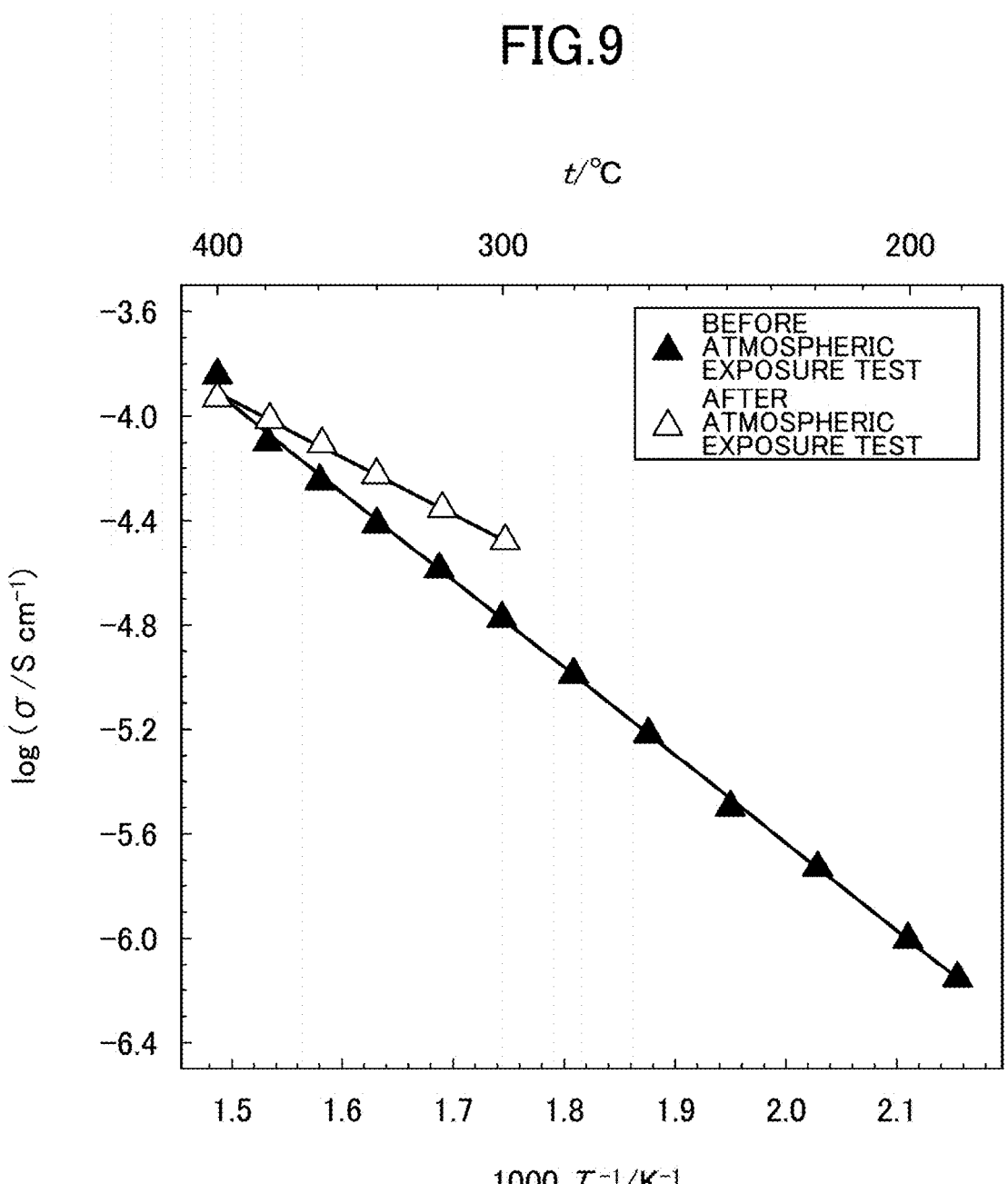
FIG. 9 is a graph indicating temperature dependencies of conductivity of the hydride ion conductor according to one embodiment of the present disclosure (Sample 3).

| Sample | Composition | State after atmospheric exposure test | X-ray diffraction chart | Temperature dependency of conductivity |
|---|---|---|---|---|
| 1 | $SrMgH_3F_1$ | Denature one hour after atmospheric exposure | FIG. 5 (measured 1 H after atmospheric exposure) | FIG. 3 (ii) |
| 2 | $SrMgH_2F_2$ | Remain unchanged | FIG. 6 | FIG. 3 (iii) FIG. 8 |
| 3 | $SrMgH_1F_3$ | Remain unchanged | FIG. 7 | FIG. 3 (iv) FIG. 9 |
| 11 | $SrMgH_4$ | Decompose immediately after atmospheric exposure | Not measurable | FIG. 3 (i) |
| 12 | $SrMgF_4$ | Remain unchanged | — | FIG. 3 (v) |

In the atmospheric exposure test, Sample 11 started to decompose immediately after release to the atmosphere, and denatured very rapidly. Meanwhile, Sample 1 to Sample 3 took a longer time than in Sample 11 to start to denature, and were relatively stable. Especially, in Sample 2 and Sample 3, approximately no denaturing was observed even after one-week release to the atmosphere.

FIG. 5 indicates the X-ray diffraction analysis results of Sample 1. Also, FIG. 6 and FIG. 7 indicate the X-ray diffraction analysis results of Sample 2 and Sample 3.

The X-ray diffraction analysis results of Sample 1 were measured one hour after the release to the atmosphere. Meanwhile, the X-ray diffraction analysis results of Sample 2 and Sample 3 were measured one week after the release to the atmosphere. Note that, Sample 11 started to decompose immediately after the release to the atmosphere, and thus the X-ray diffraction analysis could not be performed.

FIG. 6 and FIG. 7 also indicate the X-ray diffraction analysis results before the release to the atmosphere.

From FIG. 6 and FIG. 7, it was found that approximately no phase change occurred before and after the atmospheric exposure in Sample 2 and Sample 3.

The above-described (ii) of FIG. 3 indicates the temperature dependency of conductivity obtained in Sample 1 before the release to the atmosphere. Also, the above-described (iii) of FIG. 3 indicates the temperature dependency of conductivity obtained in Sample 2 before the release to the atmosphere, and the above-described (iv) of FIG. 3 indicates the temperature dependency of conductivity obtained in Sample 3 before the release to the atmosphere. Moreover, the (i) of FIG. 3 indicates the temperature dependency of conductivity obtained in Sample 11 before the release to the atmosphere, and the (v) of FIG. 3 indicates the temperature dependency of conductivity obtained in Sample 12 before the release to the atmosphere.

As illustrated in FIG. 3, the conductivity at each temperature was the lowest in Sample 12, and was higher in the order of Sample 3, Sample 2, Sample 1, and Sample 11.

FIG. 8 indicates the temperature dependency of conductivity obtained in Sample 2 after the release to the atmosphere. For comparison, FIG. 8 also indicates the results measured before the atmospheric exposure (i.e., curve (iii) in FIG. 3).

From this result, it was found that Sample 2 maintained high conductivity even after the atmospheric exposure. For example, the conductivity at 300° C. of Sample 2 after the atmospheric exposure was about $10^{-7.0}$ S/cm.

FIG. 9 indicates the temperature dependency of conductivity obtained in Sample 3 after the release to the atmosphere. For comparison, FIG. 9 also indicates the results measured before the atmospheric exposure (i.e., curve (iv) in FIG. 3).

From this result, it was found that Sample 3 maintained high conductivity even after the atmospheric exposure. For example, the conductivity at 300° C. of Sample 3 after the atmospheric exposure was about $10^{-4.5}$ S/cm.

Note that, for Sample 3, the conductivity at 300° C. after the atmospheric exposure was higher than the conductivity at 300° C. before the atmospheric exposure.

In this way, Sample 1 to Sample 3 were confirmed to have atmospheric stability higher than in Sample 11.

According to the present disclosure, it is possible to provide a hydride ion conductor that is more stable in the atmospheric environment.

What is claimed is:

1. A hydride ion conductor, wherein the hydride ion conductor is represented by:

$$MAMBH_{4-x}F_x \qquad \text{Formula (1), where}$$

MA is selected from the group consisting of Ca, Sr, and Ba,

MB is selected from the group consisting of Mg and Ca, and is different from MA, and x is $0 < x < 4$.

2. The hydride ion conductor according to claim 1, wherein the hydride ion conductor has a $BaZnF_4$-type structure, and conductivity at 300° C. of the hydride ion conductor is $10^{-5}$ S/cm or higher.

3. The hydride ion conductor according to claim 1, wherein $MAMBH_{4-x}F_x$ of Formula (1) is $SrMgH_{4-x}F_x$ or $BaMgH_{4-x}F_x$, where x is $0 < x < 4$.

4. The hydride ion conductor according to claim 2, wherein $MAMBH_{4-x}F_x$ of Formula (1) is $SrMgH_{4-x}F_x$ or $BaMgH_{4-x}F_x$, where x is $0 < x < 4$.

\* \* \* \* \*